(12) United States Patent
Timmermans et al.

(10) Patent No.: US 9,377,124 B2
(45) Date of Patent: Jun. 28, 2016

(54) NORMALLY LOW SOLENOID VALVE ASSEMBLY

(71) Applicant: Continental Automotive Systems, Inc., Auburn Hills, MI (US)

(72) Inventors: Marc Timmermans, Gooik (BE); Eddy Wilgenhof, Buizingen (BE); Marie-Noelle Gris, Niel (BE); An Huyghe, Zemst (BE); Peter Steylaerts, Berlaar (BE); Koen Vermolen, Boechout (BE); Johan Van De Plas, Baal (BE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 47 days.

(21) Appl. No.: 14/489,675

(22) Filed: Sep. 18, 2014

(65) Prior Publication Data
US 2015/0102242 A1   Apr. 16, 2015

Related U.S. Application Data

(60) Provisional application No. 61/891,007, filed on Oct. 15, 2013.

(51) Int. Cl.
*F16K 31/02* (2006.01)
*F16K 31/06* (2006.01)

(52) U.S. Cl.
CPC ......... *F16K 31/0675* (2013.01); *F16K 31/0631* (2013.01)

(58) Field of Classification Search
CPC ............ F16K 31/0686; F16K 31/0665; F16K 31/0631; F16K 39/02; F16K 1/14; F16K 27/029; Y10T 137/87217; Y10T 137/87209; Y10T 137/87241

USPC ................... 137/596.17, 596.16; 251/129.15, 251/129.04
See application file for complete search history.

(56) References Cited

U.S. PATENT DOCUMENTS

| 4,165,762 A | 8/1979 | Acar |
| 4,578,662 A * | 3/1986 | Slavin ................. F16K 31/0631 137/625.65 |

(Continued)

FOREIGN PATENT DOCUMENTS

| DE | 19624897 A1 | 1/1998 |
| DE | 10047399 A1 | 4/2002 |

(Continued)

OTHER PUBLICATIONS

European Patent Office Search Report dated Apr. 8, 2015.

(Continued)

*Primary Examiner* — Kevin Murphy
*Assistant Examiner* — Minh Le

(57) ABSTRACT

A solenoid assembly for providing control over fluid pressure distribution in a transmission, where the solenoid assembly includes a solenoid portion and a valve portion, and the movement of the valve portion is controlled by the solenoid portion. There is a valve which is part of the valve portion, and the valve controls the distribution of fluid between a supply port, a control port, and an exhaust port. The distribution of fluid between the ports may include providing a pressure balance between the supply port and the control port, and allowing any excess fluid to pass through the exhaust port, or controlling the flow of fluid between the supply port and the control port, with any excess fluid exiting the exhaust port.

16 Claims, 4 Drawing Sheets

(56) References Cited

U.S. PATENT DOCUMENTS

| | | | | |
|---|---|---|---|---|
| 4,756,331 A * | 7/1988 | Stegmaier | ............ | F16K 31/0627 137/271 |
| 4,783,049 A * | 11/1988 | Northman | ............ | F16H 61/0009 137/625.65 |
| 4,998,559 A * | 3/1991 | McAuliffe, Jr. | ...... | F16H 61/0251 137/596.17 |
| 5,050,642 A * | 9/1991 | Bright | ................ | F16K 31/0631 137/625.65 |
| 5,135,027 A * | 8/1992 | Miki | ................... | F16K 31/0631 137/596.17 |
| 5,160,116 A * | 11/1992 | Sugiura | ............... | F16K 31/0665 137/596.17 |
| 5,651,391 A * | 7/1997 | Connolly | ............ | F15B 13/0405 137/454.6 |
| 6,000,508 A | 12/1999 | Forster | | |
| 6,209,563 B1 * | 4/2001 | Seid | ................... | F15B 13/0405 137/15.21 |
| 6,866,063 B2 * | 3/2005 | Avila | ................. | G05D 16/2013 137/596.17 |
| 6,877,526 B2 * | 4/2005 | Burrola | ................. | F16K 11/048 137/596.17 |
| 6,997,436 B2 * | 2/2006 | Barron | .................... | B60T 8/363 251/129.15 |
| 7,051,993 B2 * | 5/2006 | Kim | ................... | F02M 51/0685 251/129.15 |
| 7,137,411 B2 * | 11/2006 | Golovatai-Schmidt | | F16K 31/0637 137/625.65 |
| 7,243,680 B2 * | 7/2007 | Golovatai-Schmidt | ... | F01L 1/34 137/596.17 |
| 8,127,791 B2 * | 3/2012 | Najmolhoda | ......... | F16K 31/062 137/596.17 |
| 9,163,746 B2 * | 10/2015 | Voss | .................... | F16K 31/0658 |
| 2005/0173979 A1 * | 8/2005 | Voss | ........................ | B60T 8/363 303/119.2 |
| 2006/0278838 A1 * | 12/2006 | Chavanne | ........... | F16K 31/0631 251/129.15 |
| 2007/0284008 A1 * | 12/2007 | Brower | ............... | F16K 31/0624 137/625.25 |
| 2008/0203343 A1 * | 8/2008 | Kratzer | ................... | B60T 8/363 251/129.15 |
| 2010/0078507 A1 * | 4/2010 | Short | ..................... | F02M 53/06 239/584 |
| 2011/0253919 A1 * | 10/2011 | Imamura | ............. | F16H 61/0251 251/129.15 |
| 2012/0313022 A1 | 12/2012 | Godbillon | | |
| 2012/0313029 A1 | 12/2012 | Karl et al. | | |
| 2013/0048106 A1 * | 2/2013 | Lee | ........................ | F01L 13/00 137/492.5 |
| 2014/0311440 A1 * | 10/2014 | Lee | ........................ | F01M 1/16 123/196 CP |
| 2015/0090913 A1 * | 4/2015 | Buehner | ............ | F02M 51/0685 251/129.19 |

FOREIGN PATENT DOCUMENTS

| | | |
|---|---|---|
| DE | 102010002216 A1 | 8/2011 |
| DE | 102012202485 A1 | 8/2013 |
| JP | S63103105 U | 7/1988 |
| JP | 2000-154883 A | 6/2000 |
| JP | 2006071003 A | 3/2006 |
| JP | 2013-519853 A | 5/2013 |
| KR | 10-2012-0109122 A | 10/2012 |
| KR | 101239704 B1 | 3/2013 |
| WO | 03091079 A1 | 11/2003 |

OTHER PUBLICATIONS

DE 10047399 A1 English Machine Translation.
DE 10 2012 202 485 A1 English Machine Translation.
KR 101239704 B1 English Abstract.

* cited by examiner

NORMALLY LOW SOLENOID VALVE ASSEMBLY

CROSS-REFERENCE TO RELATED APPLICATIONS

This application claims the benefit of U.S. Provisional Application No. 61/891,007 filed Oct. 15, 2013. The disclosure of the above application is incorporated herein by reference.

FIELD OF THE INVENTION

The invention relates generally to a solenoid assembly which ensures stable force balance and pressure control with magnetic and hydraulic forces.

BACKGROUND OF THE INVENTION

Solenoids are generally known, and some solenoids are used to control fluid pressure in different types of hydraulic systems. Some transmissions use open-loop systems to control the actuation of different components, and control pressure in different locations in the transmission. Some types of highly precise solenoids have been incorporated into these open-loop applications. However, many different types of solenoids have issues with contamination, and disproportionate magnetic and hydraulic forces during operation. Additionally, despite these solenoids having high levels of precision, the control units for these solenoids need to be individually calibrated in production. Accordingly, there exists a need for a solenoid assembly which overcomes the aforementioned drawbacks, and may be used as part of a closed-loop feedback control system in a transmission to eliminate the need for calibration of the controller.

SUMMARY OF THE INVENTION

The present invention is a normally low solenoid assembly for a transmission, where the normally low solenoid assembly has a low, or zero, output when inactivated. The normally low solenoid assembly of the present invention is used for providing control over fluid pressure distribution in a transmission, where the solenoid assembly includes a solenoid portion and a valve portion, and the movement of the valve portion is controlled by the solenoid portion. There is a valve which is part of the valve portion, and a magnet core and armature which are part of the solenoid portion such that the armature moves toward and away from the magnet core.

A plunger is connected to the armature, and in contact with the valve. A sleeve surrounds the armature and the valve portion, such that the valve portion is substantially contained within the sleeve. A valve seat is part of the valve portion and surrounded by the sleeve, and the valve is selectively in contact with the valve seat. A supply port, a control port, and an exhaust port are formed as part of the sleeve such that all three ports are in fluid communication with the valve portion.

A return spring is located between the magnet core and the armature, the return spring biasing the armature away from the magnet core, such that the return spring biases the valve toward a closed position. A coil at least partially surrounds the sleeve, the coil being part of the solenoid portion. The armature and plunger move towards the coil when the coil is energized, allowing fluid flowing into the supply port to move the valve away from the valve seat, such that at least a portion of the fluid flows through the control port. When the coil de-energized, the valve moves towards the valve seat, and at least a portion of the fluid flows through the exhaust port.

The sleeve includes a small diameter portion and a large diameter portion which are integrally formed together. The armature is substantially surrounded by the large diameter portion, and the valve portion is substantially surrounded by the small diameter portion. The supply port, the control port, and the exhaust port are all integrally formed as part of the small diameter portion of the sleeve. A separation plate is located within the large diameter portion of the sleeve, the separation plate separates the valve portion from the solenoid portion, and the plunger extends through the separation plate.

The valve seat includes a first insert disposed in the small diameter portion of the sleeve, and a second insert disposed in the small diameter portion of the sleeve. The valve in one embodiment is a ball, and the ball is disposed between the first insert and the second insert. The ball is in contact with the second insert when the valve is in the closed position, and the ball moves away from the second insert and towards the first insert when the valve changes to the open position.

Different types of manufacturing methods may be used to create the solenoid assembly. In one embodiment, the sleeve and the separation plate are deep drawn parts, but it is within the scope of the invention that other types of manufacturing methods may be used.

In one embodiment, the solenoid assembly of the present invention is used in a closed-loop feedback control system in a hydraulic system for a transmission.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
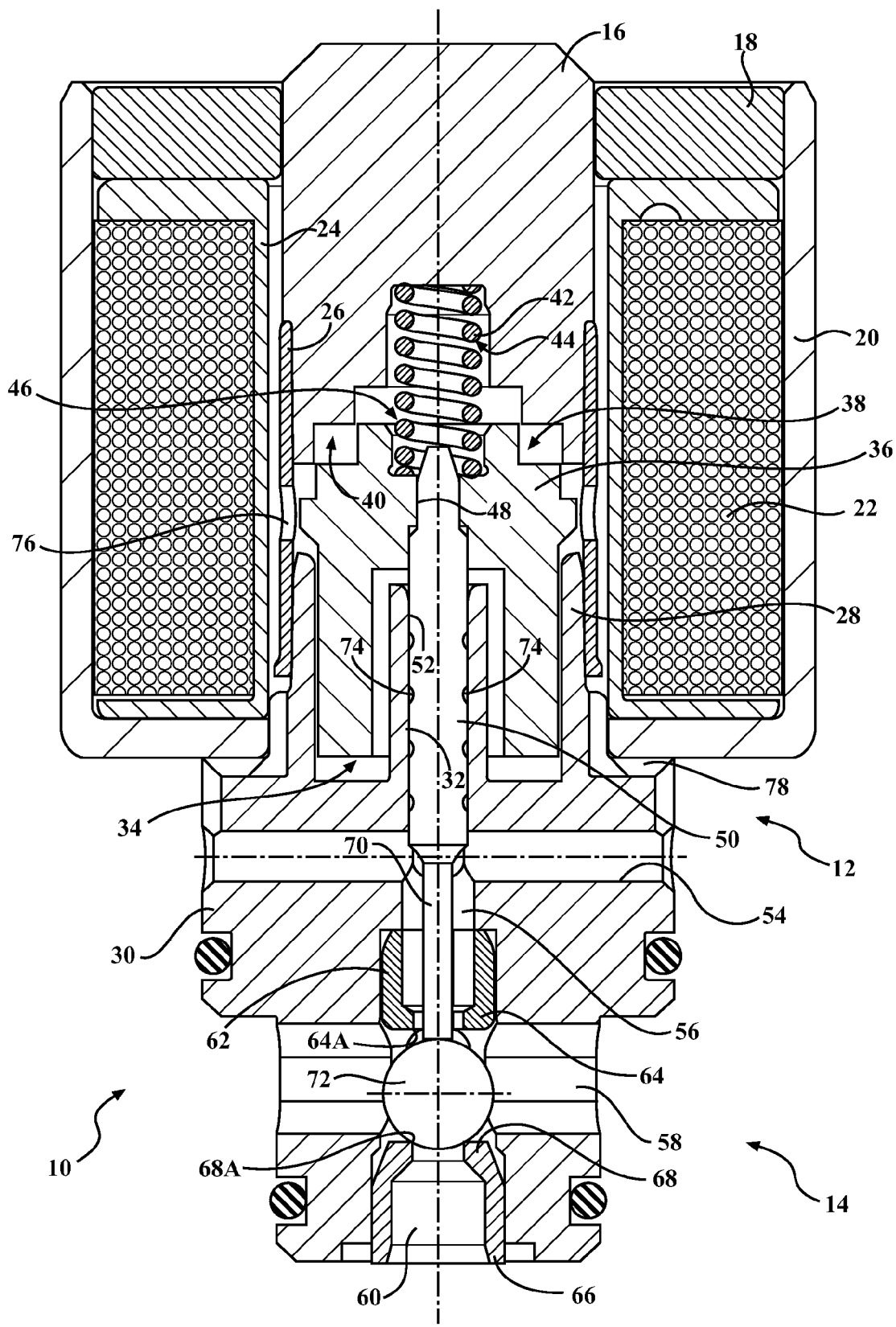
FIG. 1 is a sectional side view of a solenoid assembly, according to embodiments of the present invention.

A solenoid assembly according to the present invention is shown in FIG. 1 generally at 10. The solenoid assembly 10 includes a solenoid portion, shown generally at 12, and a valve portion, shown generally at 14. The solenoid portion 12 includes a magnet core 16 connected to a plate 18. The plate 18 is magnetically connected to a yoke ring 20 by a press-fit connection, but it is within the scope of the invention that other types of connections may be used.

The yoke ring 20 partially surrounds an outer surface of a coil 22, and the coil 22 at least partially surrounds a bobbin 24. Surrounded by the bobbin 24 is a sleeve 26, and the sleeve 26 at least partially surrounds the magnet core 16, and also at least partially surrounds an outer wall 28 formed as part of a housing 30. The sleeve 26 is magnetically connected to the magnet core 16 and the outer wall 28 through a laser welding process. The housing 30 also includes an inner wall 32, and a recess, shown generally at 34, located between the outer wall 28 and inner wall 32. Partially located in the recess 34 is a main body of an armature 36, which is able to move relative to the magnet core 16 and the housing 30.

The armature 36 also includes a stepped portion, shown generally at 38, which is shaped to correspond to a stepped portion, shown generally at 40, formed as part of the magnet core 16.

A spring 42 is disposed between the magnet core 16 and the armature 36. More specifically, the spring 42 is partially disposed in a recess, shown generally at 44, formed as part of the magnet core 16, and the spring 42 is also partially disposed in another recess, shown generally at 46, formed as part of the armature 36. The spring 42 biases the armature 36 away from the magnet core 16, the function of which will be described later. In one embodiment, the spring 42 is a hot preset spring 42, which helps to ensure a constant spring preload over the lifetime use of the spring 42, and have stable force balancing between the magnetic and hydraulic forces in the solenoid assembly 10.

The main body of the armature 36 also has an aperture 48, and a plunger 50 that is press-fit connected therein. However, it is within the scope of the invention that plunger 50 may be held in place in the aperture 48 in other ways. The plunger 50 extends through another aperture 52 formed as part of the inner wall 32 of the housing 30, such that the plunger 50 is at least partially surrounded by the inner wall 32. The plunger 50 and armature 36 are also movable relative to the housing 30, such that a portion of the plunger 50 slides within the aperture 52 formed as part of the inner wall 32, and the inner wall 32 also functions as a guide to the movement of the plunger 50, and prevents the armature 36 from moving relative to the sleeve 26 in an undesirable manner.

The housing 30 also includes an exhaust port 54, which is in fluid communication with an intermediary port 56, the intermediary port 56 is in fluid communication with a control port 58, and the control port 58 is in fluid communication with a supply port 60. Disposed in the intermediary port 56 is a first insert 62, and the first insert 62 includes an exhaust seat 64. Disposed in the supply port 60 is a second insert 66, and the second insert 66 includes a supply seat 68. The first insert 62 is press-fit into the intermediary port 56, and the second insert 66 is press-fit into the supply port 60. The plunger 50 also includes a reduced diameter portion 70 which extends through the intermediary port 56 and partially into the control port 58. The reduced diameter portion 70 contacts a valve member, which in this embodiment is a ball 72, but it is within the scope of the invention that other types of valves may be used. The reduced diameter portion 70 and the ball 72 are part of the valve portion 14.

In operation, pressurized fluid flows into the supply port 60 and is prevented from entering into the control port 58 because the spring 42 biases the valve portion 14 to a closed position when no current is applied to the coil 22 (the ball 72 is in contact with the supply seat 68 when the valve portion 14 is in the closed position, as shown in FIG. 1). When current is applied to the coil 22, magnetic force is generated to overcome the force of the spring 42 applied to the armature 36, such that the armature 36 moves toward the magnet core 16, and therefore the plunger 50 also is moved away from the ball 72, allowing the ball 72 to lift off of the supply seat 68, and fluid to pass from the supply port 60 to the control port 58.

When the ball 72 is in the closed position, as shown in FIG. 1, there is an air gap between the armature 36 and the magnet core 16, and the stepped portions 38,40 of the armature 36 and magnet core 16 create a larger air gap between the armature 36 and the magnet core 16, as compared to an armature and magnet core not having stepped portions 38,40. This increased air gap allows for an increased force output between the armature 36 and the magnet core 16 when the coil 22 is energized, and provides for better control over movement of the armature 36 when the coil 22 is energized to place the armature 36 in intermediate positions between the magnet core 16 and the housing 30.

If enough current is applied to the coil 22, the armature 36 and plunger 50 move close enough to the magnet core 16 to allow the ball 72 to contact the exhaust seat 64, such that all of the fluid from the supply port 60 flows into the control port 58. However, when the solenoid assembly 10 is used in certain applications, current is applied to the coil 22 to move the armature 36 and allow the ball 72 to move away from the supply seat 68, and provide a pressure balance between the supply port 60 and the control port 58. Additionally, the current applied to the coil 22 may be varied to control the fluid passing between the supply port 60 and control port 58, and therefore control the fluid pressure in the supply port 60 and control port 58.

Figure 2:
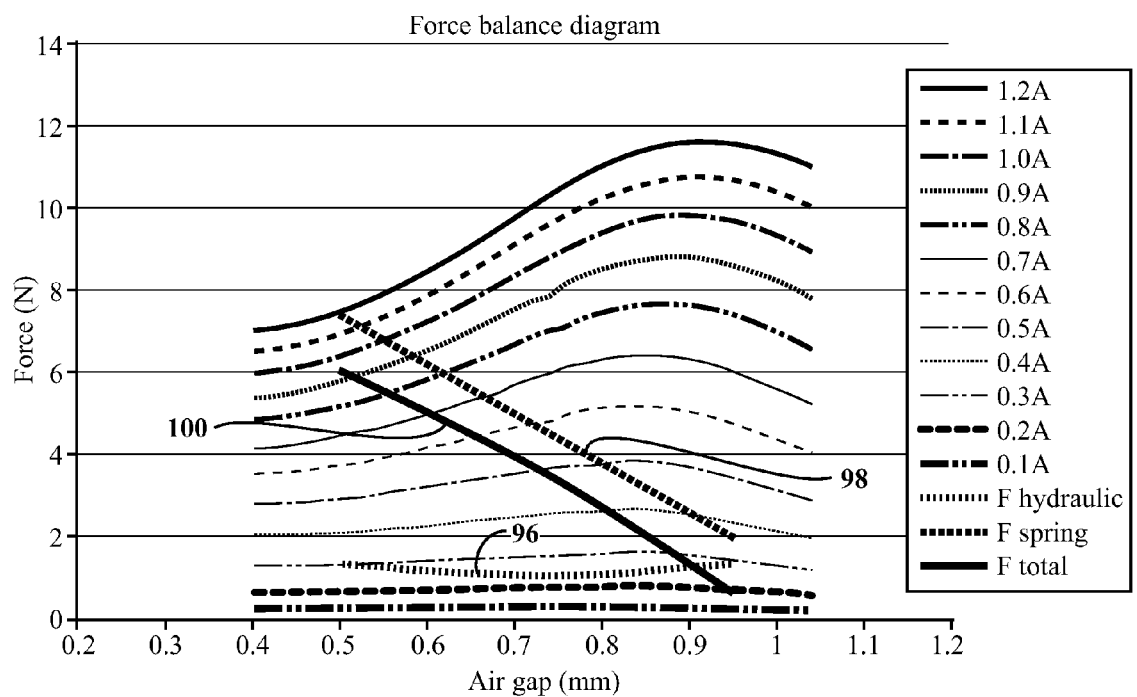
FIG. 2 is a force balance diagram of a solenoid assembly, according to embodiments of the present invention.

Once the current is no longer applied to the coil 22, there is no longer a magnetic attraction between the armature 36 and the magnet core 16, and the spring 42 moves the plunger 50 and armature 36 away from the magnet core 16, and therefore moves the ball 72 toward the supply seat 68 to place the valve portion 14 in the closed position. As this occurs, fluid in the control port 58 flows through the intermediary port 56 and through the exhaust port 54. The amount of current applied to the coil 22 may be varied to vary the position of the armature 36, plunger 50, and therefore the ball 72, to vary the amount of fluid passing from the supply port 60 to the control port 58 and exhaust port 54. A chart depicting the force balance relationship between the current applied to the coil 22, the force applied to the armature 36 by the spring 42, and the position of the armature 36 is shown in FIG. 2. The current shown as part of the chart in FIG. 2 includes several curves depicting current verses force at multiple currents. The curve for the hydraulic force is shown at 96, the curve for the spring force is shown at 98, and curve for the summation of the hydraulic force 96 and spring force 98 is shown at 100.

Figure 3:
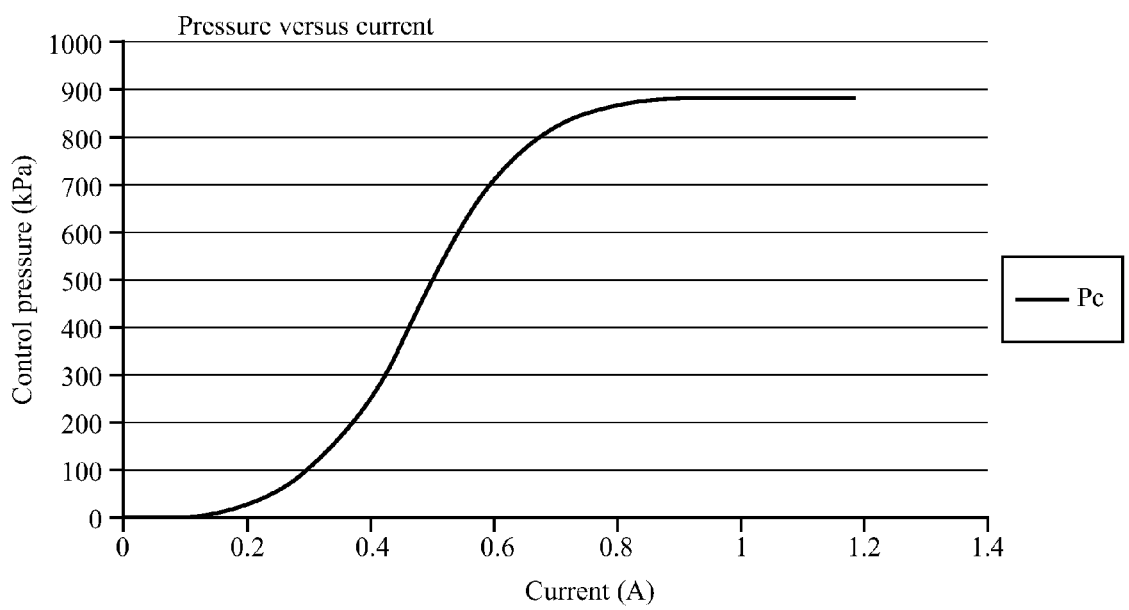
FIG. 3 is a diagram depicting pressure versus current characteristics of a solenoid assembly, according to embodiments of the present invention.

A chart depicting the pressure in the control port 58 versus the current applied to the coil 22 is shown in FIG. 3. The solenoid assembly 10 of the present invention is referred to as a "normally low" solenoid assembly, in reference to the state of the output. When no current is applied to the coil 22 (the solenoid assembly 10 is inactive), the ball 72 is in contact with the supply seat 68, and the pressure in the control port 58 is very low or substantially zero. The pressure in the ports 54,58,60 may be detected using one or more pressure sensors. As the current is applied to the coil 22 and then increased, the ball 72 moves away from the supply seat 68 and closer to the exhaust seat 64, increasing the pressure in the control port 58. This relationship of increase in current applied to the coil 22 and increase in pressure in the control port 58 is shown in FIG. 3. When the ball 72 is in contact with the exhaust seat 64, the pressure in the supply port 60 and the pressure in the control port 58 are substantially equal. In one embodiment, the solenoid assembly 10 is used as part of a closed-loop feedback control system in a transmission.

The solenoid assembly 10 also has several features to prevent debris from flowing into the area around the armature 36. The plunger 50 includes several ribs 74 which create a tortuous path for the flow of the fluid, and therefore limits or prevents debris from flowing past the plunger 50 and around the armature 36. The ribs 74 also reduce friction between the plunger 50 and the aperture 52, and the fluid in the ribs 74 also provides lubrication to reduce wear. In one embodiment, the armature 36 is also coated with a Teflon coating to reduce friction between the armature 36 and the outer wall 28.

Formed as part of the sleeve 26 are exit apertures 76, and fluid around the armature 36 is able to flow out of the exit apertures 76 and around the sleeve 26, and out one or more grooves 78 formed as part of the housing 30. The exit apertures 76 and the grooves 78 provide pressure equilibrium around the armature 36, such that any fluid that flows into the area around the armature 36 has little to no effect on the movement of the armature 36. Additionally, the flow path through the exit apertures 76 and the grooves 78 creates a tortuous path to prevent dirt migration into the air gap between the armature 36 and magnet core 16 from outside of the assembly 10.

To facilitate optimal contact between the ball 72 and the supply seat 68 and contact between the ball 72 and the exhaust seat 64, both the supply seat 68 and exhaust seat 64 have a tapered edge, or sharp edge 68A and 64A, respectively, to balance forces under flow conditions. The seats 64,68 also ensure stable functionality over various temperature ranges, and control leakage over the lifetime of the assembly. The shape of the edges 64A,68A minimizes the hydraulic force variations at constant supply pressure during positioning of the ball 72, and ensure a stable sealing diameter and hydraulic force on the ball 72 over the lifetime of the assembly 10.

Figure 4:
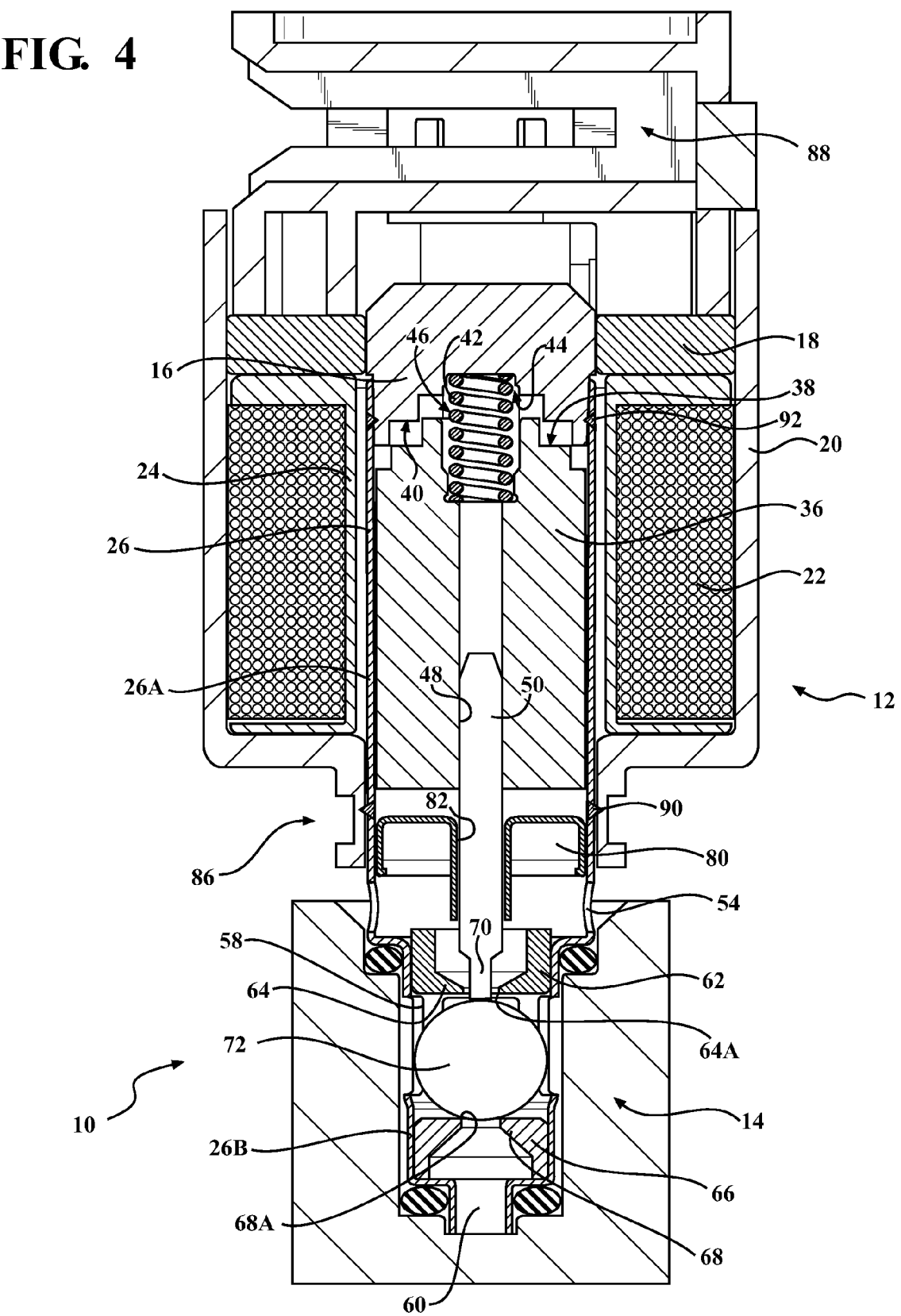
FIG. 4 is a sectional side view of an alternate embodiment of a solenoid assembly, according to embodiments of the present invention.
Figure 5:
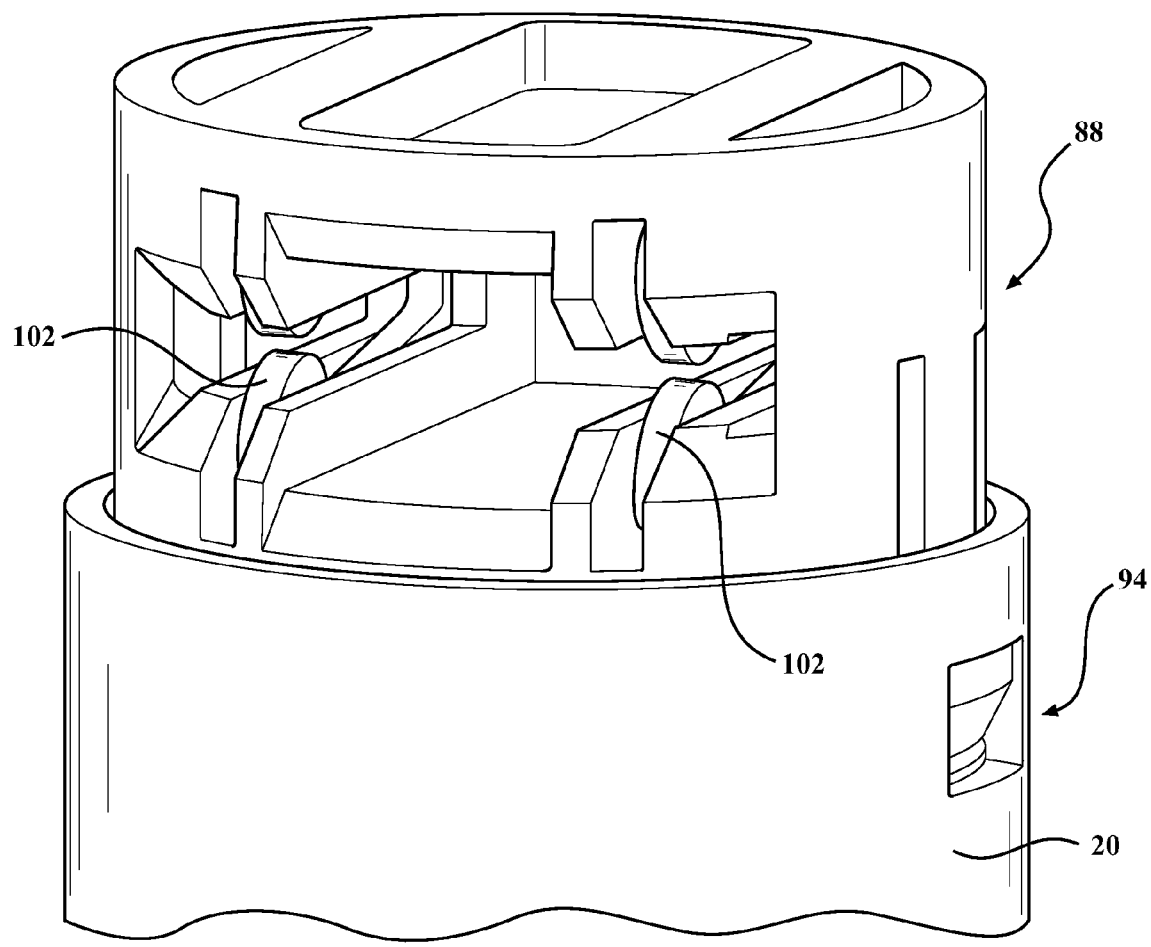
FIG. 5 is a perspective view of a cap connected to a yoke, which is part an alternate embodiment of a solenoid assembly, according to embodiments of the present invention.

Another embodiment of the present invention is shown in FIGS. 4-5, with like numbers referring to like elements. However, in this embodiment, the housing 30 is not used, and the sleeve 26 is larger such that the sleeve 26 contains the valve portion 14. In one embodiment, the sleeve 26 is a deep drawn part, containing all the parts of the valve portion 14. The sleeve 26 shown in FIG. 3 is magnetic conductive to optimize the magnetic forces between the armature 36 and the magnet core 16. In one embodiment, the armature 36 shown in FIG. 3 has a Teflon coating to reduce friction between the armature 36 and the sleeve 26, and reduce the magnetic eccentric forces. The sleeve 26 in this embodiment has two portions, a large diameter portion 26A and a small diameter portion 26B. The armature 36 is located in the large diameter portion 26A, and the valve portion 14 is located in the small diameter portion 26B. More specifically, both of the inserts 62,66 and the ball 72 are located in the small diameter portion 26B of the sleeve 26. The ball 72 in this embodiment has a larger diameter than the ball 72 shown in FIG. 1, which reduces hydraulic force variations in the valve portion 14.

Additionally, the exhaust port 54 is formed as part of the large diameter portion 26A, the control port 58 is formed as part of the small diameter portion 26B, and the supply port 60 is formed as part of the small diameter portion 26B. The supply port 60 shown in FIG. 3 extends outwardly away from the second insert 66, and has a diameter that is smaller than the diameter of the small diameter portion 26B.

Also, in this embodiment, there is a separation plate 80 located within the sleeve 26, and the plate 80 has an aperture 82 which the plunger 50 extends through. The separation plate 80 is located in the large diameter portion 26A of the sleeve 26 in an area between the armature 36 and the exhaust port 54. The separation plate 80 separates the valve portion 14 from the solenoid portion 12, preventing the solenoid portion 12 from being exposed to the fluid in the valve portion 14. In one embodiment, the separation plate 80 is a deep drawn part, but it is within the scope of the invention that other methods may be used to form the separation plate 80.

The yoke ring 20 shown in FIG. 3 is larger than the yoke ring 20 shown in FIG. 1, and includes several retention features shown generally at 86. The retentions features 86 are integrally formed with the yoke ring 20, and the yoke ring 20 in this embodiment is formed as a single piece, and as a deep drawn part, but it is within the scope of the invention that other methods may be used to form the yoke ring 20. The sleeve 26 is connected to the yoke ring 20 through the use of a first weld connection 90, and the sleeve 26 is also connected to the magnet core 16 through the use of a second weld connection 92.

The embodiment shown in FIG. 3 also includes a cap, shown generally at 88, which connects with and is surrounded by part of the yoke ring 20. The cap 88 is connected to the yoke ring 20 through a snap-fit connection, shown generally at 94, in FIG. 5. The snap fit connection 94 also functions to properly position the cap 88 relative to the yoke ring 20, such that any data marking on the cap 88 is correctly positioned as well. Furthermore, the cap 88 also protects electrical terminals 102 from becoming exposed and contaminated by the fluid.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid assembly for a transmission, comprising:
a solenoid portion;
a valve portion, the movement of the valve portion controlled by the solenoid portion;
a valve member being part of the valve portion;
a magnet core being part of the solenoid portion;
an armature being part of the solenoid portion, the armature moveable toward and away from the magnet core for moving said valve member;
a return spring disposed between the magnet core and the armature, the return spring biasing the armature away from the magnet core;
a magnetic sleeve, the sleeve having a large diameter portion integrally formed with a small diameter portion, the sleeve large diameter portion surrounding the armature and at least part of the magnet core, and the sleeve small diameter portion surrounding the valve portion, such that the valve portion is substantially contained within the sleeve;
a supply port formed as part of the sleeve small diameter portion, such that the supply port receives fluid and the supply port is in fluid communication with the valve portion;
a first valve seat being part of the valve portion and surrounded by the sleeve small diameter portion, the valve member being selectively in contact with the valve seat;
a control port formed as part of the sleeve small diameter portion such that the control port is in fluid communication with the valve portion;
an exhaust port formed as part of the sleeve small diameter portion, such that the exhaust port is in fluid communication with the valve portion;

a coil for moving said armature, the coil at least partially surrounding the sleeve, the coil being part of the solenoid portion; and a yoke ring at least partially surrounding the coil and being magnetically connected with the core and welded with the sleeve.

2. The solenoid assembly of claim 1 wherein a separation plate is located within the sleeve, the separation plate separating the valve portion from the solenoid portion.

3. The solenoid assembly of claim 2 wherein the separation plate is located in the sleeve between the exhaust port and the armature.

4. The solenoid assembly of claim 2 wherein the separation plate is disposed in the large diameter portion of the sleeve.

5. The valve assembly of claim 1 wherein the armature has a main body connected with a plunger for contacting the valve member.

6. The solenoid assembly of claim 1 wherein the sleeve is connected to the core by a laser welding process.

7. The solenoid assembly of claim 1 wherein the armature has a Teflon coating.

8. The solenoid assembly of claim 1 wherein the yoke is connected to the core by a press fitted plate.

9. The solenoid assembly of claim 1, the valve portion further comprising the first valve seat being provided by a first insert providing an exhaust seat and a second valve seat being provided by a second insert providing a supply seat and wherein the valve member is in contact with the supply seat when the valve is in the closed position, and the valve member moves away from the supply seat and towards the exhaust seat when the valve is moved to the open position.

10. The solenoid assembly of claim 1 wherein the armature moves towards the magnet core when the coil is energized, allowing fluid flowing into the supply port to move the valve member relative to the first valve seat, such that at least a portion of the fluid flows through the control port, and when the coil is de-energized, the valve member moves relative to the first valve seat such that at least a portion of the fluid flows through the exhaust port.

11. The solenoid assembly of claim 1 wherein the sleeve is welded to the core.

12. The solenoid assembly of claim 2 wherein the separation plate is a deep drawn part.

13. The solenoid assembly of claim 2 wherein the valve member is a ball.

14. The solenoid assembly of claim 1 wherein the solenoid assembly is a variable current solenoid assembly.

15. A solenoid assembly for a transmission, comprising:
a solenoid portion;
a valve portion, the movement of the valve portion controlled by the solenoid portion;
a valve member being part of the valve portion;
a magnet core being part of the solenoid portion;
an armature being part of the solenoid portion, the armature having a connected plunger in contact with the value member, the armature moveable toward and away from the magnet core for moving said valve member;
a return spring disposed between the magnet core and the armature, the return spring biasing the armature away from the magnet core;
a magnetic sleeve, the sleeve having a large diameter portion integrally formed with a small diameter portion, the sleeve large diameter portion surrounding the armature and welded around at least part of the magnet core, and the sleeve small diameter portion surrounding the valve portion, such that the valve portion is substantially contained within the sleeve;
a supply port formed as part of the sleeve small diameter portion, such that the supply port receives fluid and the supply port is in fluid communication with the valve portion;
an exhaust valve seat provided by a first insert being part of the valve portion and surrounded by the sleeve small diameter portion, the valve member being selectively in contact with the exhaust seat;
a supply valve seat provided by a second insert wherein the valve member is in contact with the supply seat when the valve is in the closed position and towards the exhaust seat when the valve is in the open position;
a control port formed as part of the sleeve small diameter portion such that the control port is in fluid communication with the valve portion;
an exhaust port formed as part of the sleeve small diameter portion, such that the exhaust port is in fluid communication with the valve portion;
a coil for moving said armature, the coil at least partially surrounding the sleeve, the coil being part of the solenoid portion;
a yoke ring at least partially surrounding the coil and being magnetically connected with the core and welded with the sleeve large diameter portion; and
a separation plate located in the sleeve large diameter portion and separating the valve portion from the solenoid portion between the armature and the exhaust port, the plunger extending through the separation plate.

16. The solenoid assembly of claim 15 wherein the separation plate is a deep drawn part.

\* \* \* \* \*